(12) United States Patent
Van Druten et al.

(10) Patent No.: US 7,765,887 B2
(45) Date of Patent: Aug. 3, 2010

(54) DRIVE PROVIDED WITH A CONTINUOUSLY VARIABLE TRANSMISSION AND A CHARGEABLE REVERSE SHAFT

(76) Inventors: Roell Marie Van Druten, Grasleeuwerik 8, NL-5658 EG Eindhoven (NL); Bas Gerard Vroeman, Melkweg 51, NL-5642 CP Eindhoven (NL); Alexander Franciscus Anita Serrarens, Adriaen van Ostadelaan 7, NL-5581 JS Eindhoven (NL)

( * ) Notice: Subject to any disclaimer, the term of this patent is extended or adjusted under 35 U.S.C. 154(b) by 539 days.

(21) Appl. No.: 11/789,864

(22) Filed: Apr. 26, 2007

(65) Prior Publication Data

US 2008/0139358 A1    Jun. 12, 2008

(51) Int. Cl.
*F16H 3/14*    (2006.01)
(52) U.S. Cl. .......................................... 74/355; 475/198
(58) Field of Classification Search ................... 74/355, 74/361, 665 P
See application file for complete search history.

(56) References Cited

U.S. PATENT DOCUMENTS

| | | | | |
|---|---|---|---|---|
| 2,973,845 A | * | 3/1961 | Sinclair | 192/218 |
| 3,363,732 A | * | 1/1968 | Nakamura et al. | 192/218 |
| 3,548,987 A | * | 12/1970 | Dudey et al. | 192/104 F |
| 4,433,594 A | * | 2/1984 | Smirl | 475/206 |
| 4,459,872 A | | 7/1984 | Tibbles | |
| 4,706,518 A | | 11/1987 | Moroto et al. | |
| 2004/0224811 A1 | * | 11/2004 | Vornehm et al. | 475/207 |

FOREIGN PATENT DOCUMENTS

GB    950816    2/1964

* cited by examiner

*Primary Examiner*—Sherry L Estremsky
*Assistant Examiner*—Erin D Bishop
(74) *Attorney, Agent, or Firm*—Eric Karich

(57) ABSTRACT

A drive has a drive source and a continuously variable transmission, with an outgoing shaft having a first gear wheel. A clutch is present between the drive source and the ingoing shaft. The outgoing shaft of the transmission is connected to a gear wheel connected to a differential via a drive line for driving forwards. The drive line has an intermediate shaft with thereon a second gear wheel, which is interlocked with the first gear wheel and the third gear wheel, which is interlocked with the gear wheel. For reversing, the drive line can be interrupted by means of a disengagement and the drive is provided with a further drive line between the gear wheel that is connected to the differential and the outgoing shaft of the transmission.

7 Claims, 3 Drawing Sheets

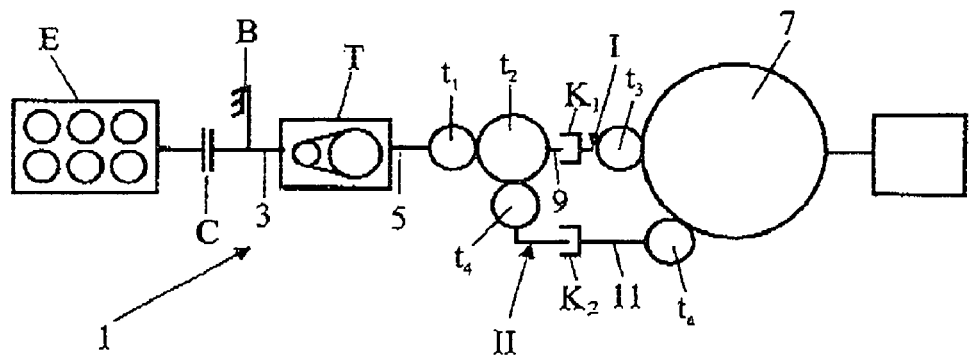
FIG. 1
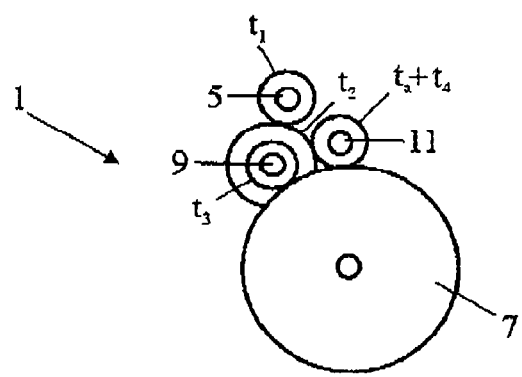
FIG. 2
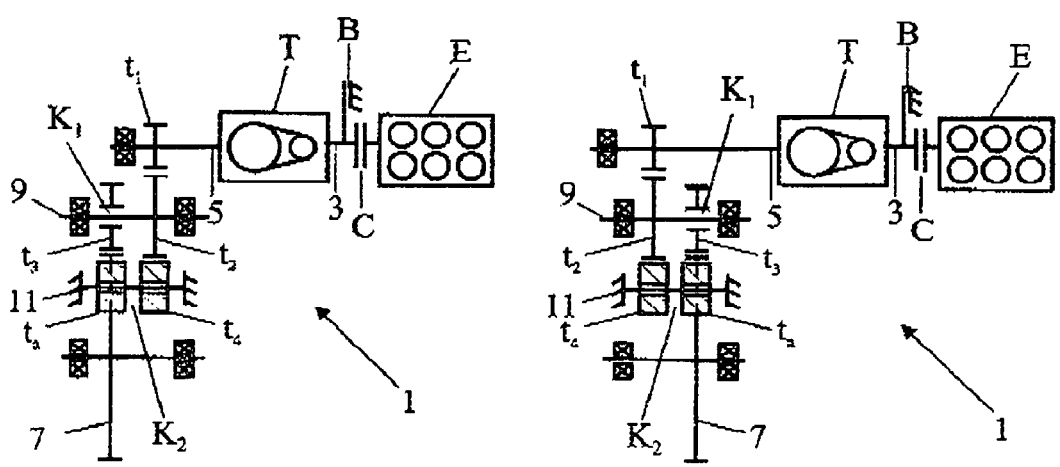
FIG. 3                    FIG. 4

DRIVE PROVIDED WITH A CONTINUOUSLY VARIABLE TRANSMISSION AND A CHARGEABLE REVERSE SHAFT

BACKGROUND OF THE INVENTION

1. Field of the invention

The invention relates to a drive comprising a drive source, a continuously variable transmission with an ingoing shaft, which is connected to the drive source and an outgoing shaft with thereon a first gear wheel, a clutch between the drive source and the ingoing shaft of the transmission, and a differential, which is connected via a drive line to the outgoing shaft of the transmission, which drive line comprises an intermediate shaft with thereon a second gear wheel that is interlocked with the first gear wheel and a third gear wheel that is interlocked with a gear wheel that is connected to the differential, which intermediate shaft is present between the first gear wheel on the outgoing shaft and the differential.

More in particular the invention relates to such a drive for use in a vehicle.

2. Prior art

Such a drive for use in a vehicle is generally known in vehicles that are provided with a continuously variable transmission. In the well-known drive there is a planetary gear wheel set present between the drive source and the continuously variable transmission of which a rotation body can be braked and the two other rotation bodies, which are connected to the drive source and the ingoing shaft of the transmission respectively, can be connected to each other. By connecting these two rotation bodies to each other, this drive, when used in a vehicle, can be used to drive forwards and in reverse by disengaging them and blocking the brake.

SUMMARY OF THE INVENTION

An objective of the invention is to provide a drive of the sort described in the preamble in which with a simple construction the possibility is created to drive in reverse. For this purpose the drive according to the invention is characterized in that the drive line can be interrupted by means of a disengagement, which is present between the second and third gear wheel, and the drive moreover is provided with a further drive line between the differential and the outgoing shaft of the transmission, which further drive line comprises a reverse shaft, which is parallel to the intermediate shaft, with a reverse gear wheel, which is interlocked with the gear wheel connected to the differential, and a fourth gear wheel, which can be connected to the reverse gear wheel and is interlocked with the second gear wheel, and which further drive line can be interrupted by an additional clutch, which is present between the reverse gear wheel and the fourth gear wheel. The disengagement can here for example disengage the second gear wheel from the intermediate shaft, and the additional clutch can here for example disengage the reverse gear wheel from the reverse shaft.

Instead of a planetary gear wheel set, the drive according to the invention performs the reverse function by an extra reverse shaft, whereby the differential can be changed with the transmission via the intermediate shaft or the reverse shaft. This is a simpler and cheaper construction than that of the well-known drive and moreover less shaft incorporation space can be used with this construction than with the well-known construction due to the absence of the planetary gear wheel set. The disengagement and the additional clutch can be made as positive clutches, for example claw clutches.

Moreover by closing the disengagement and the additional clutch a parking function can be obtained in which the wheels are blocked.

Note that a drive is known from U.S. Pat. No. 4,459,872 in which the weight can be driven in a direction opposite to the normal direction by a reverse shaft, which is parallel to the outgoing shaft of the drive source and on which two gear wheels are present, one of which is interlocked with the large gear wheel of the end transmission. However, here the other gear wheel is interlocked with a gear wheel on the outgoing shaft of the drive source and not with a gear wheel on an intermediate shaft, as is the case with the construction according to the invention. Should this construction be used on the well-known drive, this will give a drive with two parallel drive lines, which can both drive the vehicle in the forward direction. To cause the further drive line to drive the vehicle in reverse, the drive must be adapted further and moreover various adaptations are possible.

Moreover, note that a drive is known from JP 61294247 in which the drive line comprises an intermediate shaft for the forward direction and in which the further drive line comprises a reverse shaft for the reverse direction with two gear wheels thereon. However, both gear wheels are here interlocked with respectively one of the gear wheels on the reverse shaft and a further gear wheel on the outgoing shaft of the transmission. None of the gear wheels on the reverse shaft is thus interlocked with the gear wheel connected to the differential, as is the case with the drive according to the invention. If the construction of the drive known from U.S. Pat. No. 5,085,302 should be used with this drive, then a drive would be obtained in which one of the gear wheels on the reverse shaft is interlocked with the gear wheel connected to the differential and the other gear wheel on the reverse shaft would be interlocked with the further gear wheel on the outgoing shaft of the transmission. Two drive lines are then also obtained in this manner, which drive the vehicle in the same direction and a further adaptation must be made to be able to drive the vehicle in the opposite direction with one of the drive lines, in which various adaptations are again possible.

An embodiment of the drive according to the invention is characterized in that the drive also comprises a clutch mechanism, which connects the differential via the drive line to the outgoing shaft of the transmission by closing the disengagement and/or connects the differential via the further drive line to the outgoing shaft of the transmission by closing the additional clutch.

Preferably the disengagement connects the second and third gear wheel on the intermediate shaft directly to each other. The drive clutch here therefore proceeds by the disengagement and not by the intermediate shaft. This means that the intermediate shaft does not have to be provided with splines, so that the intermediate shaft and the gear wheels can be made more simply.

Preferably the reverse gear wheel and the fourth gear wheel are connected with bearings on the reverse shaft and can be directly connected to each other. If the additional clutch is open (for forward driving) the reverse gear wheel and the fourth gear wheel turn in opposite directions. If the reverse gear wheel and the fourth gear wheel are connected with bearings with respect to each other, the maximum difference rate becomes too large. To prevent this, the reverse gear wheel and the fourth gear wheel have bearings separately from the "fixed world", each with a radial and an axial bearing. The very small forces can be coped with by small pivot bearings or sliding bearings.

If the disengagement and the additional clutch are made as positive clutches, both clutch halves can only be interlocked with each other when the vehicle is stationary. This can be done by activating the wheel brakes. The driver must then depress the brake pedal with his foot when changing in or out of reverse gear. An embodiment of the drive according to the invention, in which this is unnecessary, is characterized in that the clutch is present between the drive source and the transmission, and there is a brake between the clutch and the gear wheel connected to the differential. This brake can be activated by moving the AT selector in a vehicle into the reverse position. The brake can here only brake the vehicle and does not have a drive-off function as in the well-known drive. The brake can thus be made lighter and simpler than the brake in the well-known drive. Preferably the brake is present between the clutch and the transmission.

A further embodiment of the drive provided with a brake is characterized in that the transmission can only be engaged with the drive source via the clutch. This therefore means for example that the transmission cannot be connected to the drive source via the bypass transmission, which is parallel to the clutch between the transmission and the drive source.

BRIEF DESCRIPTION OF THE DRAWINGS

The invention will be elucidated more fully below on the basis of drawings in which embodiments of the drive according to the invention are shown. In these drawings:

FIG. 1 shows a diagram of a first embodiment of the drive according to the invention;

FIG. 2 shows the drive shown in FIG. 1 in side-elevation;

FIG. 3 shows a practical layout of the drive shown in FIG. 1;

FIG. 4 shows a somewhat different practical layout of the drive shown in FIG. 1;

DETAILED DESCRIPTION OF THE DRAWINGS

Figure 5:
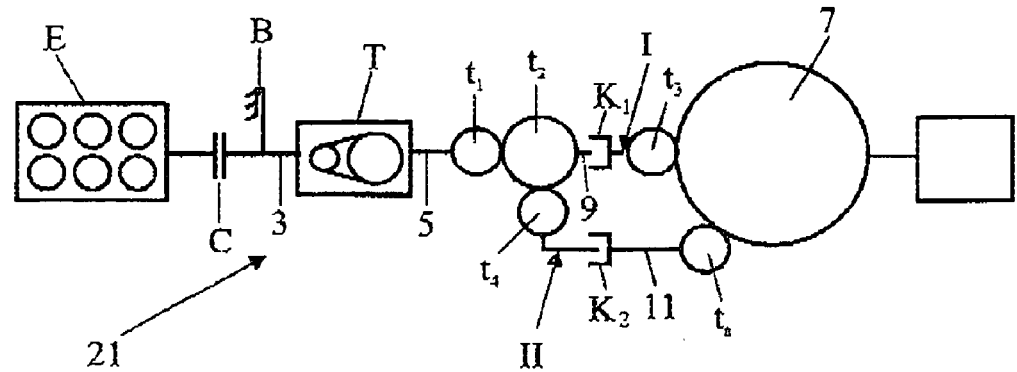
FIG. 5 shows a diagram of a second embodiment of the drive according to the invention.

FIGS. 1, 2 and 3 show a first embodiment of the drive 1 according to the invention. FIG. 1 shows a diagram of the drive 1, which is shown in FIG. 2 in side-elevation. FIG. 3 shows a practical layout of the drive 1. This drive 1 is present in a vehicle and has a drive source E, a continuously variable transmission T with an ingoing shaft 3, which is connected to the drive source E and an outgoing shaft 5 with thereon a first gear wheel $t_1$ and a clutch C between the drive source E and ingoing shaft 3 of the transmission T, for driving off from a stationary position in either forward or reverse direction.

The outgoing shaft 5 of the transmission T is connected via a drive line I to a gear wheel 7 connected to a differential. The drive line I is for driving the vehicle forwards and has an intermediate shaft 9, which is present between the first gear wheel $t_1$ on the outgoing shaft 5 and the gear wheel 7 that is connected to the differential. There is a second gear wheel $t_2$ on the intermediate shaft 9, which is interlocked with the first gear wheel $t_1$ and a third gear wheel $t_3$, which is interlocked with the gear wheel 7.

To drive in reverse, the drive line I can be interrupted by means of a disengagement $K_1$ and the drive is provided with a further drive line II between the gear wheel 7 that is connected to the differential and the outgoing shaft 5 of the transmission T. This further drive line II has a reverse shaft 11 parallel to the intermediate shaft 9, with a reverse gear wheel $t_a$, which is interlocked with the gear wheel 7 that is connected to the differential, and a fourth gear wheel $t_4$, which is interlocked with the second gear wheel $t_2$. The further drive line II can interrupted by an additional clutch $K_2$.

As the disengagement $K_1$ and the additional clutch $K_2$ are positive clutches, they can only be connected to each other when the vehicle is stationary. This can be achieved by powering the wheel brake and opening the clutch C. The driver of the vehicle must for this purpose depress the brake pedal when changing from reverse to forward or vice versa. Another option to operate the disengagement and additional clutch is by including a brake B in the drive 1, which is powered when the AT selector is moved to the forward or reverse position. The brake B is preferably between the clutch C and the transmission T, but can also be between the transmission T on one hand and the disengagement $K_1$ and the additional clutch $K_2$ on the other (shown with broken lines).

FIG. 4 shows a somewhat different practical layout of the drive shown in FIG. 1. This figure is further self-explanatory.

Figure 6:
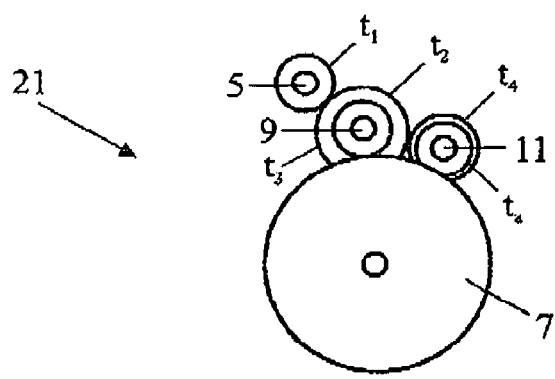
FIG. 6 shows the drive shown in FIG. 5 in side-elevation.
Figure 7:
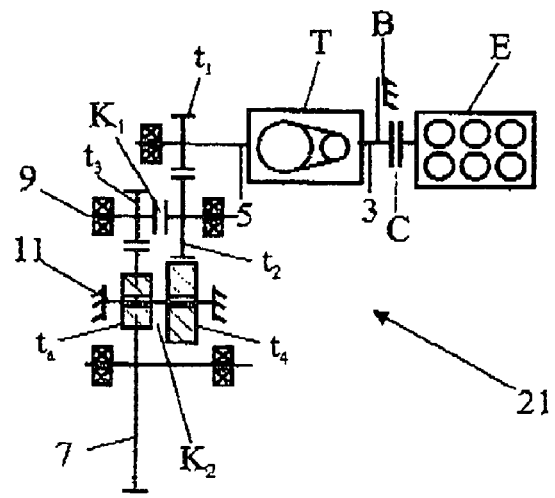
FIG. 7 shows a practical layout of the drive shown in FIG. 5.

FIGS. 5, 6 and 7 show a second embodiment of the drive 21 according to the invention. FIG. 5 shows again a diagram of the drive 21, which is shown in FIG. 6 in side-elevation. FIG. 7 shows again a practical layout of the drive 21. All parts which are equal to those of the first embodiment or have the same function are indicated by the same reference numbers.

This drive 21 closely resembles the one according to the first embodiment. Here however the second gear wheel $t_2$ and the third gear wheel $t_3$ can be directly connected to each other by the disengagement $K_1$ instead of via the intermediate shaft 9 to interrupt the drive line I for driving forward. The same applies to the reverse gear wheel $t_a$ and the fourth gear wheel $t_4$, which can be directly connected to each other via the additional clutch $K_2$. Moreover the reverse gear wheel $t_a$ and the fourth gear wheel $t_4$ in these embodiment are of different sizes. The brake B can be made very small so that it can be built inside the clutch C.

The operation of the first and second embodiment of the drive is as follows. $K_1$ is closed and $K_2$ open (neither activated) in the neutral and parking positions of the AT selector. When the AT selector is moved from the neutral or parking position into the forward position the vehicle drives off by using clutch C. The crawl function is activated with the gas pedal on position zero. The brake B will first be powered to ensure that the vehicle is stationary when moving the AT selector from the neutral or parking position into the reverse position. When stationary, $K_1$ and $K_2$ are activated and the brake B is released. This will cause the torque in the drive line to become zero so that $K_1$ opens and $K_2$ closes. The vehicle can then be driven in reverse via clutch C. Changing the AT selector from the reverse position to the forward position will power the brake B at a certain vehicle speed (7.5 km/h) until the vehicle comes to a stop. When stationary, $K_1$ and $K_2$ are deactivated and the brake B is released. This will cause the torque in the drive line to become zero so that $K_1$ closes and $K_2$ opens. The vehicle can then be driven forwards via the clutch C. Changing the AT selector from the forward position to the reverse position will power the brake B at a certain vehicle speed (7.5 km/h) until the vehicle comes to a stop. When the vehicle is stationary $K_1$ and $K_2$ are deactivated and the brake B is released. This will cause the torque in the drive line to become zero so that $K_1$ opens and $K_2$ closes. The vehicle can then be driven in reverse via the clutch C.

Figure 8:
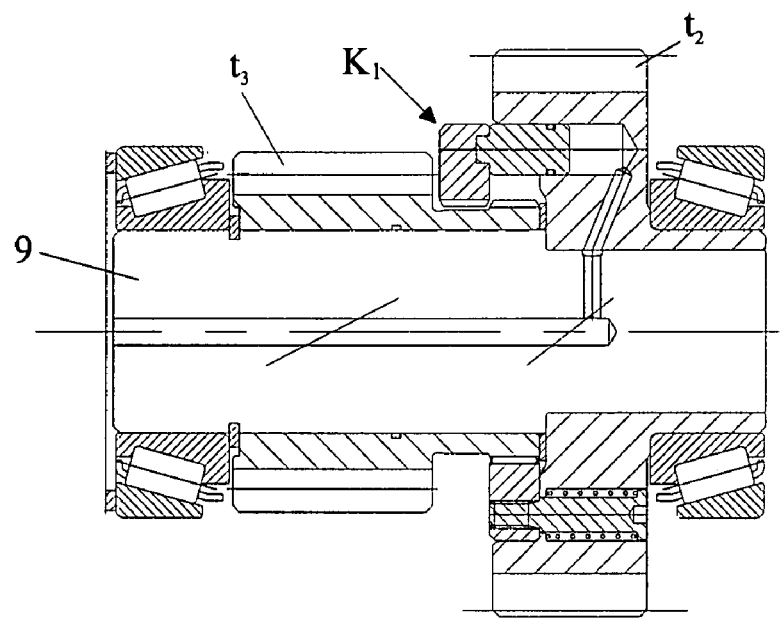
FIG. 8 shows the intermediate shaft with thereon gear wheels $t_2$ and $t_3$ and the disengagement $K_1$ in detail.
Figure 9:
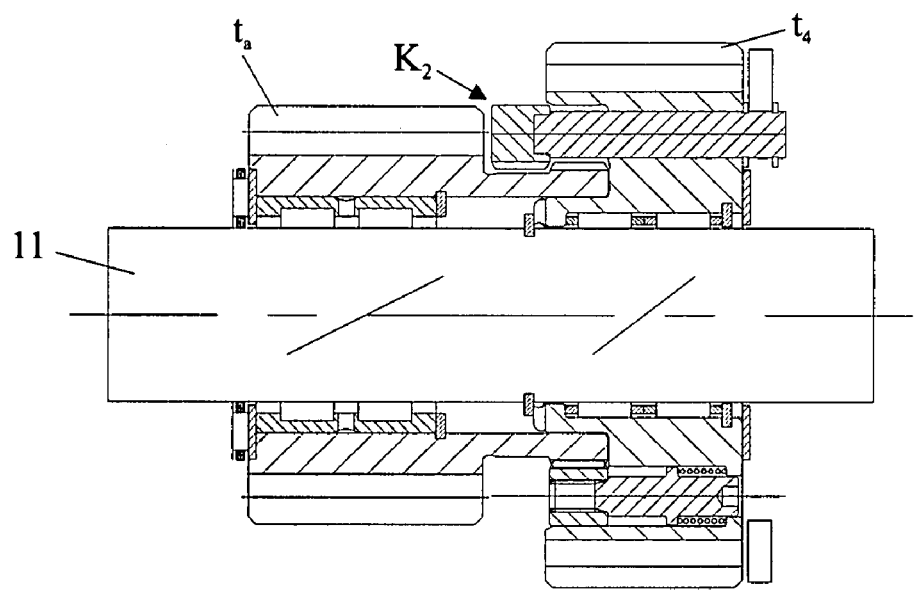
FIG. 9 shows the reverse shaft 11 with thereon part-gear wheels $t_a$ and $t_4$ and the additional clutch $K_2$ in detail.

FIGS. 8 and 9 show the intermediate shaft 9, with thereon the gear wheels $t_2$ and $t_3$ and the disengagement $K_1$ and the reverse shaft 11, with thereon the reverse gear wheel $t_a$ and the fourth gear wheel $t_4$ and the additional clutch $K_2$ of the drive 21 in detail.

It is clear in FIG. 8 that the drive clutch now proceeds via the disengagement $K_1$ and no longer via the intermediate shaft 9. This means that the intermediate shaft 9 does not have to be provided with splines, so that the intermediate shaft and the gear wheels $t_2$ and $t_3$ can be made simpler. The axial forces work inwards with a right-toothed gear wheel 7 connected to the differential.

The axial forces act towards the left with the reverse shaft 11 shown in FIG. 9 during forward driving ($K_2$ open) and with the (bearing) friction that the reverse gear wheel $t_a$ and the fourth gear wheel $t_4$ experience. These gear wheels then turn in the opposite direction. If these gear wheels were connected with bearings with respect to each other, the maximum difference rate would be too large (15,000 rpm). To prevent this the part-gear wheels are connected with bearings separately with respect to the "fixed world", each with a radial and an axial bearing. The very small forces can be coped with by small pivot bearings or sliding bearings. When driving in reverse ($K_2$ closed) the axial forces also act towards the left due to the driving forces. Now, however, the radial and axial forces are much greater. This axial bearing can be made much smaller by providing the axial bearing of the reverse gear wheel $t_a$ with a spring (with waved washer) and incorporating a small axial play between the part-gear wheels. On reversing, the large axial force will ensure that the reverse gear wheel $t_a$ and the fourth gear wheel $t_4$ oppose each other so that the largest part of this force is exerted on the left (large) axial bearing. The reverse gear wheel $t_a$ and the fourth gear wheel $t_4$ turn in the same direction with $K_2$ closed.

Although in the above the invention is explained on the basis of the drawings, it should be noted that the invention is in no way limited to the embodiments shown in the drawings. The invention also extends to all embodiments deviating from the embodiments shown in the drawings within the context defined by the claims.

The invention claimed is:

1. A drive comprising:
    a drive source,
    a continuously variable transmission with an ingoing shaft, which is connected to the drive source and an outgoing shaft with thereon a first gear wheel,
    a clutch between the drive source and the ingoing shaft of the transmission, and
    a differential, which is connected via a drive line to the outgoing shaft of the transmission, which drive line has an intermediate shaft with thereon a second gear wheel that is interlocked with the first gear wheel and a third gear wheel that is interlocked with a gear wheel that is connected to the differential, which intermediate shaft is present between the first gear wheel on the outgoing shaft and the differential,
    characterized in that
    the drive line can be interrupted by means of a disengagement, which is present between the second and third gear wheel, and
    the drive moreover is provided with a further drive line between the differential and the outgoing shaft of the transmission, which further drive line has a reverse shaft, which is parallel to the intermediate shaft, with a reverse gear wheel that is interlocked with the gear wheel connected to the differential, and a fourth gear wheel, which can be connected to the reverse gear wheel and is interlocked with the second gear wheel, and which further drive line can be interrupted by an additional clutch, which is present between the reverse gear wheel and the fourth gear wheel.

2. The drive according to claim 1, characterized in that the drive moreover comprises a clutch mechanism, which connects the differential via the drive line to the outgoing shaft of the transmission by closing the disengagement and/or connects the differential via the further drive line to the outgoing shaft of the transmission by closing the additional clutch.

3. The drive according to claim 1, characterized in that the disengagement connects the second and third gear wheel on the intermediate shaft directly to each other.

4. The drive according to claim 1, characterized in that the reverse gear wheel and the fourth gear wheel are connected with bearings on the reverse shaft and can be connected directly to each other.

5. The drive according to claim 1, characterized in that the clutch is present between the drive source and the transmission, and a brake is present between the clutch and the gear wheel that is connected to the differential.

6. The drive according to claim 5, characterized in that the brake is present between the clutch and the transmission.

7. The drive according to claim 5, characterized in that the transmission can only be connected via the clutch to the drive source.

* * * * *